(12) United States Patent
Pierpont et al.

(10) Patent No.: US 12,270,506 B2
(45) Date of Patent: Apr. 8, 2025

(54) FLAT PANEL DISPLAY RETAINERS

(71) Applicant: TIP-NOT L.L.C., Pleasant Grove, UT (US)

(72) Inventors: David S. Pierpont, Eagle Mountain, UT (US); Paul Pierpont, Pleasant Grove, UT (US)

(73) Assignee: TIP-NOT L.L.C., Pleasant Grove, UT (US)

( * ) Notice: Subject to any disclaimer, the term of this patent is extended or adjusted under 35 U.S.C. 154(b) by 0 days.

(21) Appl. No.: 18/098,679

(22) Filed: Jan. 18, 2023

(65) Prior Publication Data
US 2023/0228368 A1 Jul. 20, 2023

Related U.S. Application Data

(60) Provisional application No. 63/300,635, filed on Jan. 18, 2022.

(51) Int. Cl.
*F16M 13/00* (2006.01)
*F16M 11/22* (2006.01)

(52) U.S. Cl.
CPC ......... *F16M 11/22* (2013.01); *F16M 2200/08* (2013.01)

(58) Field of Classification Search
CPC ..... F16M 11/22; F16M 2200/08; F16M 13/02
See application file for complete search history.

(56) References Cited

U.S. PATENT DOCUMENTS

| | | | | | |
|---|---|---|---|---|---|
| 4,691,891 | A | * | 9/1987 | Dionne | F16M 13/02 248/205.3 |
| 5,176,437 | A | * | 1/1993 | Remington | A47B 91/08 248/500 |
| 5,692,722 | A | * | 12/1997 | Lundagards | E05B 73/0082 248/500 |
| 6,854,222 | B2 | * | 2/2005 | Hansort | E04G 21/26 403/258 |
| 6,976,663 | B1 | * | 12/2005 | Faulk | A47B 97/00 248/688 |

(Continued)

FOREIGN PATENT DOCUMENTS

| | | |
|---|---|---|
| JP | 3031174 U | 11/1996 |
| JP | 2013053636 A | 3/2013 |

OTHER PUBLICATIONS

USPTO acting as International Searching Authority, "International Search Report and Written Opinion," International Application No. PCT/US2023/011087, May 8, 2023.

*Primary Examiner* — Amy J. Sterling
(74) *Attorney, Agent, or Firm* — Dentons Durham Jones Pinegar

(57) ABSTRACT

A mount has a configuration that holds the feet of a display screen, such as a television or another flat panel display, in place on a substantially horizontally oriented surface that supports the display screen. Such a mount may include a retainer and a fastener. The retainer receives an end portion of the foot of the display screen, while the fastener secures the retainer in place on the surface that supports the display screen. The retainer may include a base and a top that define a receptacle. The receptacle may receive and optionally engage the end portion of the foot of the display screen. Methods for preventing display screens that rest upon substantially horizontally oriented surfaces are also disclosed.

12 Claims, 4 Drawing Sheets

(56) References Cited

U.S. PATENT DOCUMENTS

| | | | |
|---|---|---|---|
| 8,087,624 B2* | 1/2012 | Varney | F16M 11/10 |
| | | | 248/917 |
| 9,709,216 B2* | 7/2017 | Zing | F16B 9/05 |
| 10,113,687 B2* | 10/2018 | Wise | F16M 13/02 |
| 2008/0035823 A1 | 2/2008 | Rossini | |
| 2009/0173848 A1* | 7/2009 | Green | F16M 11/28 |
| | | | 248/291.1 |

* cited by examiner

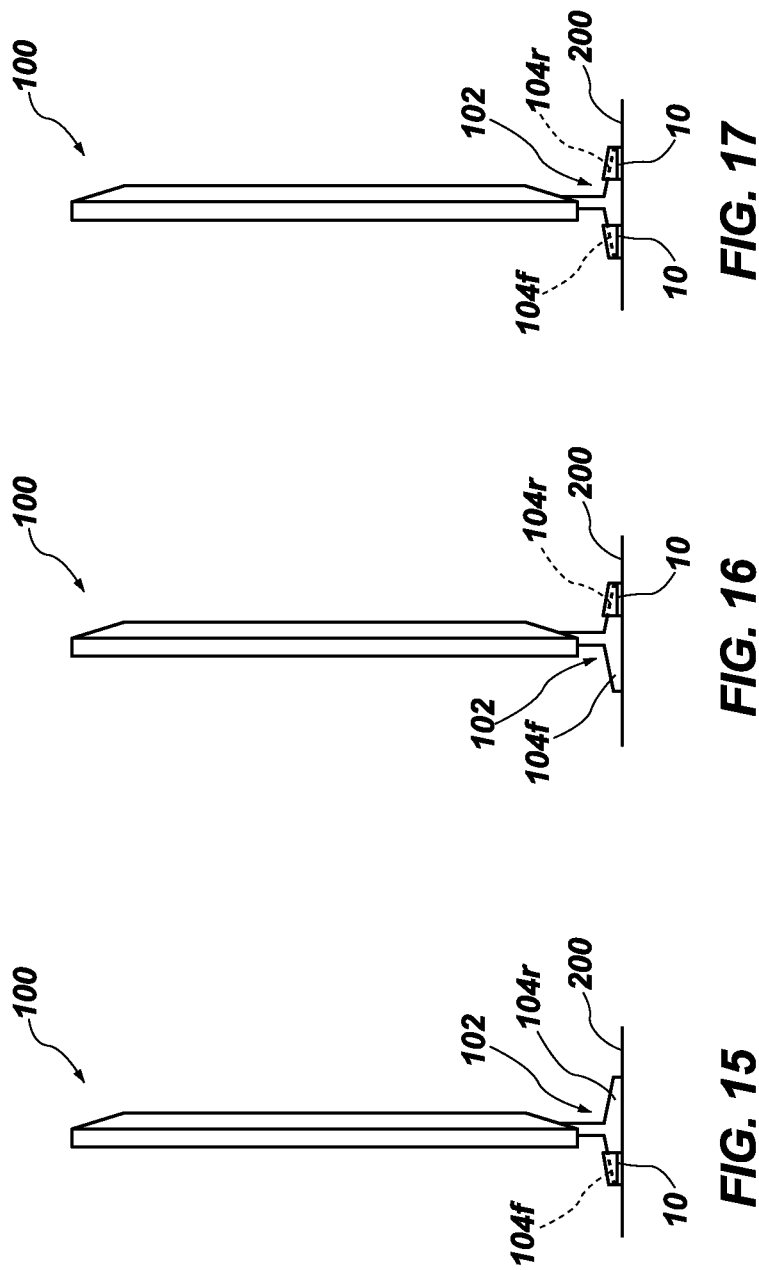

FLAT PANEL DISPLAY RETAINERS

CROSS-REFERENCE TO RELATED APPLICATION

A claim for priority to the Jan. 18, 2022 filing date of U.S. Provisional Patent Application No. 63/300,635, titled FLAT PANEL DISPLAY RETAINERS ("the '635 Provisional Application"), is hereby made pursuant to 35 U.S.C. § 119(e). The entire disclosure of the '635 Provisional Application is hereby incorporated herein.

TECHNICAL FIELD

This disclosure relates generally to devices for preventing display screens, such as televisions and other flat panel displays, that have been placed upon horizontal surfaces from tipping over forward and, optionally, from tipping over backward. This disclosure relates more specifically to mounts for securing the feet of a display screen to a substantially horizontal surface on which the display screen rests. Methods for preventing display screens that rest upon substantially horizontally oriented surfaces are also disclosed.

BACKGROUND

Display screens, such as televisions and other flat panel displays, are typically sold with feet that enable the display screens to be placed upon and supported by horizontal surfaces, such as a horizontal surface of a piece of furniture (e.g., a television (TV) stand, an entertainment center, etc.). The feet of a display screen are typically designed to hold the display screen in an upright orientation without detracting from the appearance of the display screen or the piece of furniture that supports the display screen. While the feet of a display screen may prevent the display screen from tipping over when subjected to minor impacts, they are often too small to prevent the display screen from tipping over under more significant forces, to which the display screen may be subjected during movement of the piece of furniture, as may occur during an earthquake and under a variety of other conditions.

Strapping systems have been developed to prevent display screens from tipping forward. Existing strapping systems typically require that top ends of a plurality (often two) straps be mounted to the back of the display screen (e.g., with screws, bolts, etc.), while bottom ends of the straps are mounted to the back side of the piece of furniture upon which the display screen rests (e.g., also with screws, bolts, etc.), and sizes of the straps are adjusted (e.g., lengthened, shortened, cut, etc.). Installing such a strapping system requires the use of tools, may damage the display screen and the furniture, and may consume an undesirable amount of time. Moreover, while straps prevent a display screen from tipping forward, they do not prevent the display screen from tipping backward.

SUMMARY

A mount or an anchor for securing a display screen (e.g., a flat panel display, such as a flat screen television, etc.) in place upon a surface, such as a substantially horizontal surface provided by a piece of furniture (e.g., a TV stand, an entertainment center, etc.) includes a retainer and a fastener.

The retainer may be somewhat tubular (i.e., elongated and having any cross-sectional shape(s) taken along the length thereof, with a conduit extending through the length thereof). The retainer (e.g., the conduit of a tubular retainer, etc.) may include an elongated receptacle with an open end (e.g., a rear end that is open). In some embodiments, both ends of the elongated receptacle may be open. The elongated receptacle may have a cross-sectional shape and dimensions that are substantially uniform along a length of the elongated receptacle. Alternatively, the cross-sectional shape and/or dimensions of the elongated receptacle may vary at different points along the length of the elongated receptacle. For example, the elongated receptacle may taper outwardly from its front end to its rear end. Without limitation, the elongated receptacle may be frustoconical in shape, or have the shape of the frustum of a cone, which is the portion of a cone that remains once the top or tip of the cone has been removed.

The retainer may include a base and a top. When the retainer is oriented over or on a surface to which it is to be secured, the base may face the surface and be secured to the surface, while the top may face away from the surface.

An upper surface of the base may define at least a portion of the elongated receptacle and, accordingly, also be referred to as an inner surface of the base. In some embodiments, the base may facilitate sliding of the end portion of the foot of the display screen into the elongated receptacle. Such a base may include a portion that is more rigid than the top of the retainer.

At least the top of the retainer may be flexible. At least the top of retainer may stretch. In some embodiments, at least the top of retainer may conform to a shape of at least part of an end portion of a foot that has been introduced into the elongated receptacle. In embodiments where such a retainer or at least the top thereof comprises an elastomeric material, the retainer may engage the end portion of the foot that has been introduced into the elongated receptacle. In specific but non-limiting embodiments, at least the top of the retainer may comprise silicone.

The top of the retainer may have an appearance that enables it to blend in with a remainder of the foot of the display screen and/or the surface on which the foot rests. Without limitation, in embodiments where the retainer is made to be used with a display screen having a foot that has an end portion made from black plastic, the top of the retainer may be black. As another example, where the retainer is made to be used with a display screen having a foot with an end portion that is made from or has the appearance of stainless steel, aluminum, or the like, the top of the retainer may be grey or silver. As other options, the top of the retainer may be transparent or may have a faux wood appearance.

Embodiments of retainers with receptacles that are not elongated are also within the scope of this disclosure.

In another aspect, this disclosure relates to methods for mounting, anchoring, or otherwise securing flat panel displays in place on substantially horizontal surfaces. Such a method may include placing a first retainer on an end of a first foot that the supports the display screen in an upright orientation over the substantially horizontal surface and placing a second retainer on an end of a second foot that supports the display screen in the upright orientation over the substantially horizontal surface, the second foot being laterally spaced apart from the first foot. The method may also include securing the first retainer and the second retainer to the substantially horizontal surface to prevent the display screen from tipping over.

Placing a retainer on the end of a foot may comprise introducing the end of the foot into a receptacle of the retainer. Introducing the end of the foot into the receptacle of the retainer may comprise sliding the end of the foot into the receptacle. Upon introducing the end of the foot into the receptacle, at least the top of the receptacle may at least partially conform to a shape of an end portion of the foot. At least the top portion of the retainer may resiliently engage the end portion of the foot.

The retainers may be placed on the ends of the feet before securing the retainers to the substantially horizontal surface. Such a technique may ensure proper positioning between the retainers on the substantially horizontal surface. Alternatively, the retainers may be positioned on and secured to the substantially horizontal surface before placing the ends of the feet in the receptacles of the retainers.

In some embodiments, the retainers may be secured to front facing feet of the flat panel display. In other embodiments, the retainers may be secured to rear facing feet of the flat panel display. In still other embodiments, the retainers may be secured to both front and rear facing feet of the flat panel display. Embodiments where retainers are secured to side facing feet are also within the scope of this disclosure. In any embodiment, the retainers may secure the feet to the substantially horizontal surface that supports the flat panel display, preventing the feet from being lifted off the substantially horizontal surface as the flat panel display and/or the substantially horizontal surface are subjected to forces (e.g., impacts on the flat panel display or a piece of furniture that defines the substantially horizontal surface, pulling or pushing on the flat panel display, earthquakes, etc.) that could otherwise cause the flat panel display to tip over. The retainers may prevent the flat panel display from tipping forward, tipping backward, or from tipping forward and backward.

Other aspects of this disclosure, as well as features and advantages of various aspects of the disclosed subject matter, should become apparent to those of ordinary skill in the art through consideration of the ensuing description, the drawings, and the accompanying claims.

BRIEF DESCRIPTION OF THE DRAWINGS

In the drawings:

FIGS. 15-17 are side representations illustrating how embodiments of retainers according to this disclosure may prevent a flat panel display supported by a substantially horizontal surface from tipping over.

DETAILED DESCRIPTION

Figure 1:
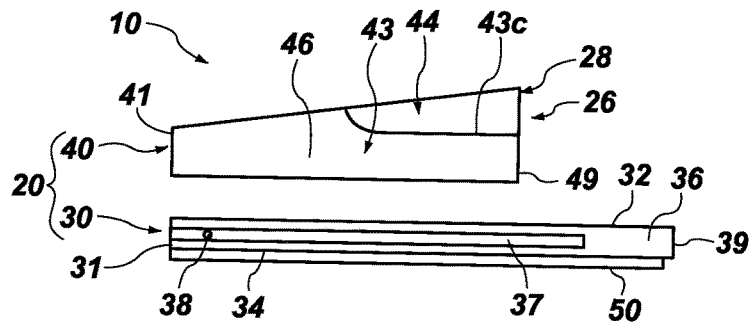
FIG. 1 is an exploded view showing the elements of an embodiment of a retainer for securing a flat panel display in place on a substantially horizontal surface.
Figure 2:
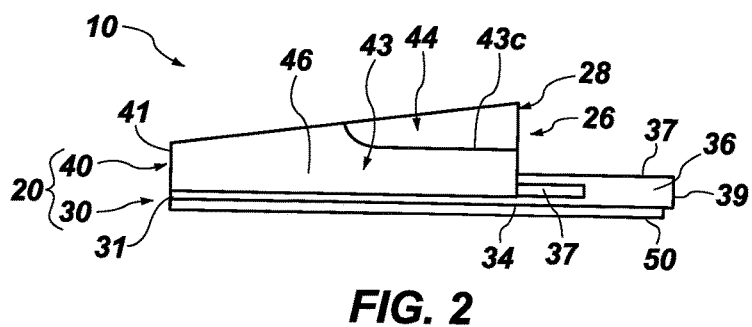
FIG. 2 is a side view of an embodiment of the retainer including the elements shown in FIG. 1.
Figure 3:
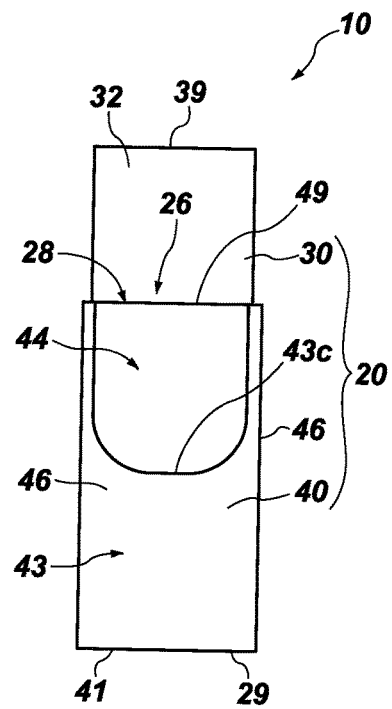
FIG. 3 is a top view of the embodiment of the retainer shown in FIG. 2.
Figure 4:
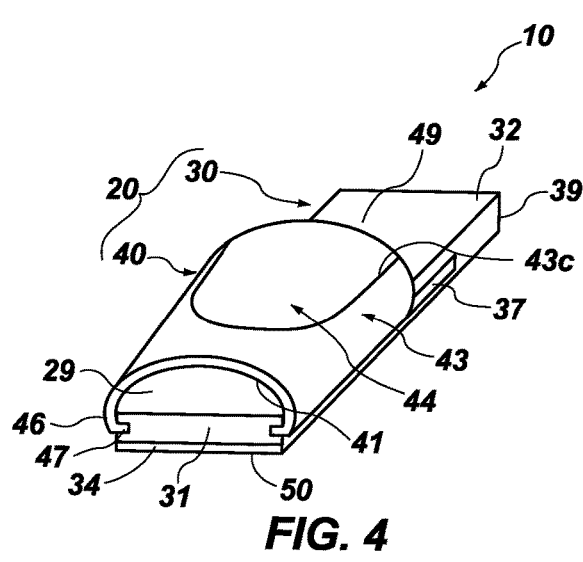
FIG. 4 is a frontal perspective view of the embodiment of the retainer shown in FIG. 2.
Figure 5:
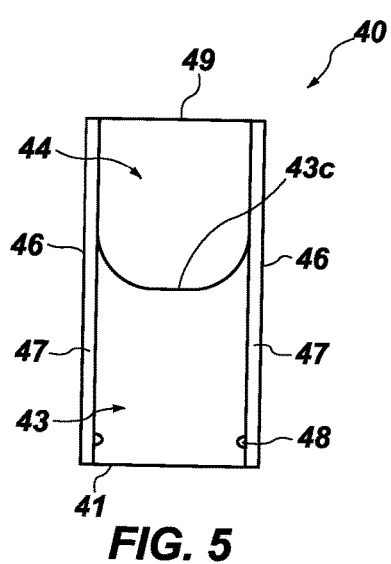
FIG. 5 is a bottom view of a top of the embodiment of the retainer shown in FIGS. 1-4.
Figure 6:
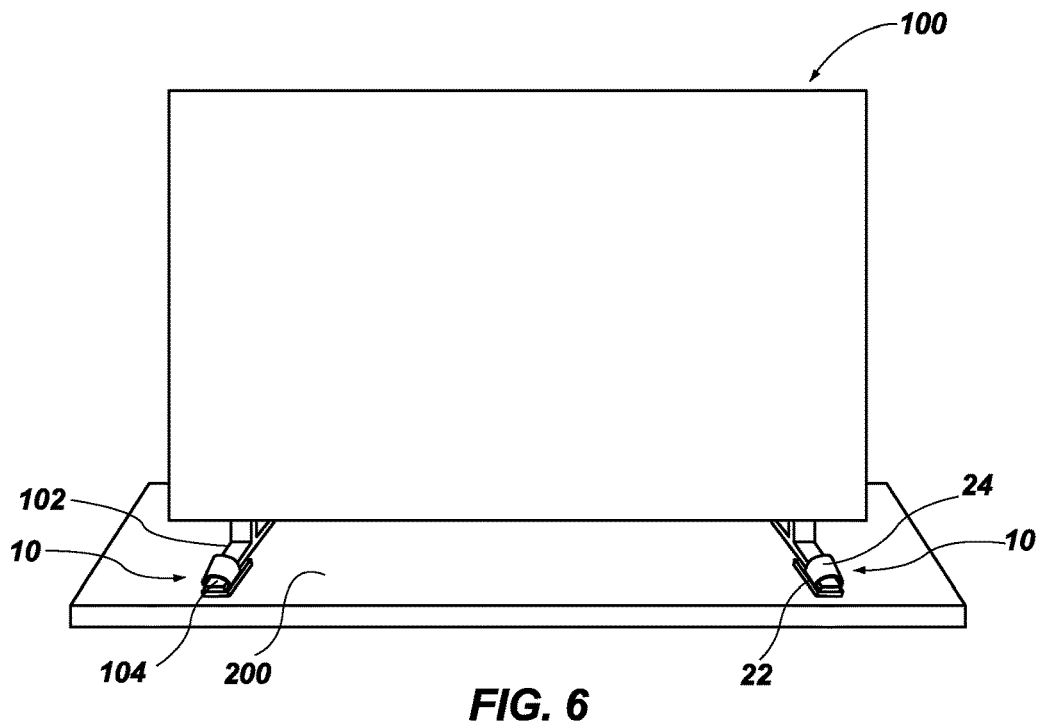
FIG. 6 provides a representation of an embodiment of use of the embodiment of the retainer shown in FIGS. 1-5 to secure feet of a flat panel television in place on a horizontal surface that supports the flat panel television.
Figure 7:
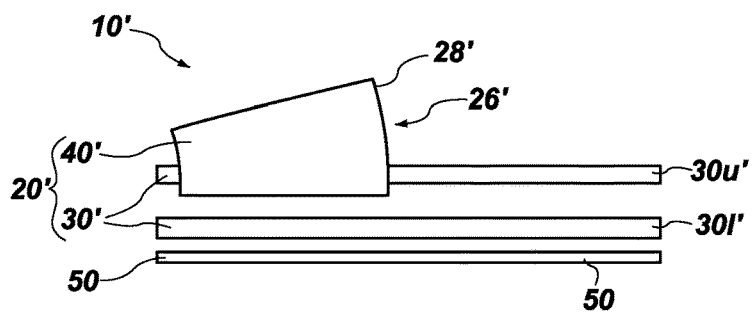
FIG. 7 is an exploded view showing the elements of another embodiment of a retainer for securing a flat panel display in place on a substantially horizontal surface.
Figure 8:
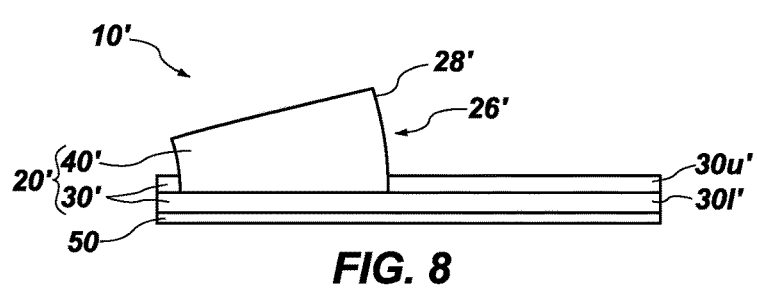
FIG. 8 is a side view of an embodiment of the retainer including the elements shown in FIG. 7.
Figure 9:
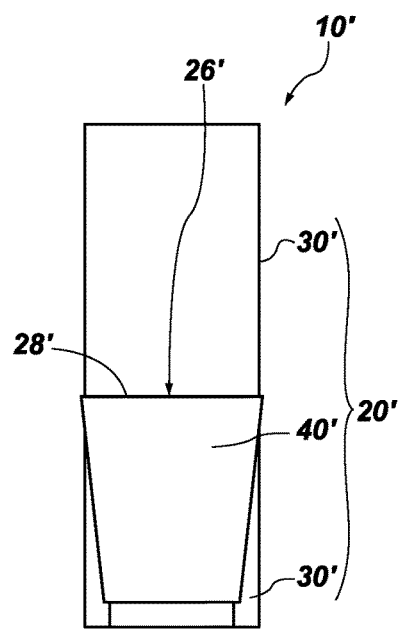
FIG. 9 is a top view of the embodiment of the retainer shown in FIG. 8.
Figure 10:
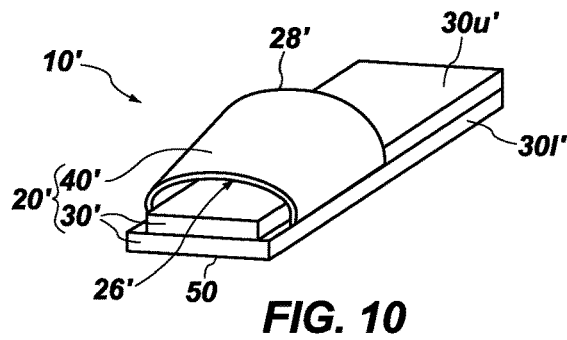
FIG. 10 is a frontal perspective view of the embodiment of the retainer shown in FIG. 8.
Figure 11:
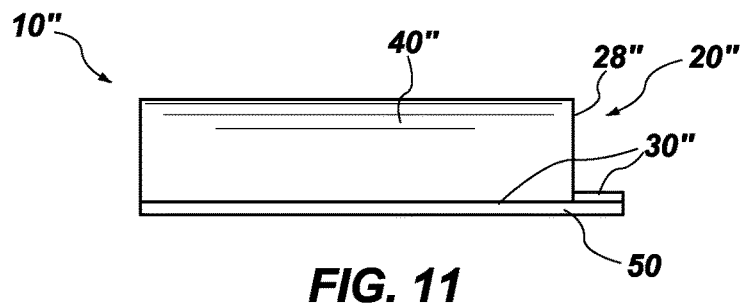
FIG. 11 is a side view of another embodiment of a retainer for securing a flat panel display in place on a substantially horizontal surface.
Figure 12:
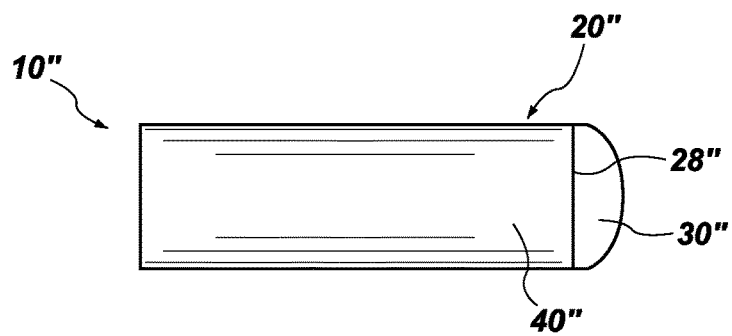
FIG. 12 is an end view of the embodiment of the retainer shown in FIG. 11.
Figure 13:
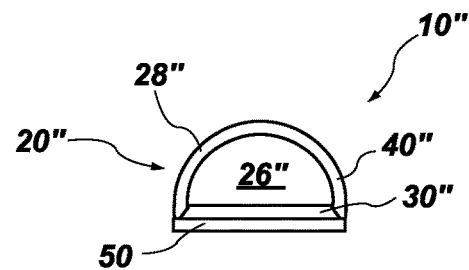
FIG. 13 is a frontal perspective view of the embodiment of the retainer shown in FIG. 11.
Figure 14:
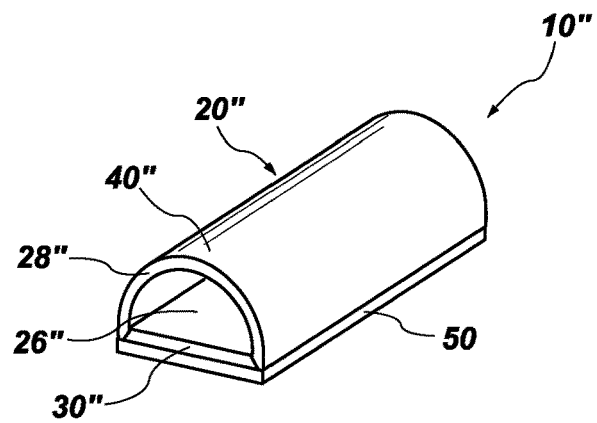
FIG. 14 is a top view of the embodiment of the retainer shown in FIG. 11.

FIGS. 1-5 provide various view of an embodiment of a mount 10 or an anchor according to this disclosure. The mount 10 includes a retainer 20 and a fastener 50. FIG. 6 shows use of the mount 10 to secure a display screen 100 (e.g., a flat panel display, such as a flat screen television, etc.) in place upon a surface 200, such as a substantially horizontal surface provided by a piece of furniture (e.g., a TV stand, an entertainment center, etc.).

The retainer 20 may be somewhat tubular (i.e., elongated and having any cross-sectional shape(s) taken along the length thereof, with a conduit extending through the length thereof). The retainer 20 (e.g., the conduit of a somewhat tubular retainer, etc.) may include a receptacle 26 with an open end 28 (e.g., a rear end that is open). The receptacle 26 may be elongated. In some embodiments, both ends 28 (e.g., the rear end) and 29 (e.g., a front end) of the receptacle 26 may be open. The receptacle 26 may have a cross-sectional shape and dimensions that are substantially uniform along a length of the receptacle 26. Alternatively, the cross-sectional shape and/or dimensions of the receptacle 26 may be different at different points along the length of the receptacle 26. For example, the receptacle 26 may taper outwardly from its front end 29 to its rear end 28. Without limitation, the receptacle 26 may be somewhat frustoconical in shape, or have the shape of the frustum of a cone (e.g., a flattened cone, etc.), which is the portion of a cone that remains once the top or tip of the cone has been removed.

The retainer 20 may include a base 30 and a top 40. When the retainer 20 is oriented over or on a surface 200 to which it is to be secured, a bottom surface 34 of the base 30 may face the surface 200, while the top 40 of the retainer 20 may face away from the surface 200.

An upper surface 32 of the base 30 may define at least a portion of the receptacle 26 and, accordingly, also be referred to as an inner surface of the base 30. In some embodiments, the base 30 may facilitate sliding of the end portion 104 of the foot 102 of the display screen 100 into the receptacle 26. Such a base 30 may include a portion that is more rigid than the top 40 of the retainer 20.

At least a portion of the top 40 of the retainer 20 may be flexible. At least a portion of the top 40 of the retainer 20 may stretch. In some embodiments, at least a portion of the top 40 of retainer 20 may conform to a shape of at least part of an end portion 104 of a foot 102 that has been introduced into the receptacle 26. In embodiments where such a retainer 20 or at least the top 40 thereof comprises an elastomeric material, the retainer 20 may engage the end portion 104 of the foot 102 that has been introduced into the receptacle 26. In specific but non-limiting embodiments, at least a portion of the top 40 of the retainer 20 may comprise silicone.

The top 40 of the retainer 20 may have an appearance that enables it to blend in with a remainder of the foot 102 of the display screen 100 (e.g., a portion of the foot 102 that is not covered by the top 40) and/or the surface 200 on which the foot 102 rests. Without limitation, in embodiments where the retainer 20 is made to be used with a display screen 100 having a foot 102 that has an end portion 104 made from black plastic, the top 40 of the retainer 20 may be black. As another example, where the retainer 20 is made to be used with a display screen 100 having a foot 102 with an end portion 104 that is made from or has the appearance of stainless steel, aluminum, or the like, the top 40 of the retainer 20 may be grey or silver. As other options, the top 40 of the retainer 20 may be transparent or may have a faux wood appearance.

In the specific embodiment illustrated by FIGS. 1-5, the retainer 20 includes a base 30 that comprises a single piece and a top 40 that can be assembled with and disassembled from the base 30. The base 30 of the retainer 20 is flat and rectangular in shape. The base 30 may be defined from, or consist of, a single piece of a material. The base 30 may be rigid. The base 30 includes a peripheral edge 36 between its upper surface 32 and bottom surface 34. A groove 37 may be formed in portions of the peripheral edge 36 that define sides of the base 30. Each groove 37 may extend from a front end 31 of the base 30 toward, but not completely to an opposite, rear end 39 of the base 30. At least one indent 38 may be formed in each groove 37 near the front end 31 of the base 30.

The base 30 may be defined from, or consist of, a single piece of a material. The material from which the base 30 is formed may be somewhat rigid. Examples of suitable materials include, without limitation, plastics (polyvinylchloride (PVC), acrylonitrile butadiene styrene (ABS), polyethylene (e.g., high density polyethylene (HDPE), ultra high molecular weight (UHMW) polyethylene, etc.), woods, metals, and the like.

The top 40 of the retainer 20 may comprise an elongated element with a somewhat D-shaped cross-section that increases in size from a front end 41 of the top 40 to a rear end 49 of the top 40. The curved portion of the D-shape defines an upper portion 42 and sides 46 of the top 40. At each side 46, the top 40 bends inwardly to define a rail 47 that forms part of the straight portion of the D-shape. The straight portion of the D-shape lacks a center, or is interrupted. The rails 47 protrude inwardly toward each other. Each rail 47 may include a protrusion 48 near the front end 41 of the top 40. The inside of the D-shape may define a portion of the receptacle 26 of the retainer 20.

The width of the top 40, the distance the rails 47 are spaced apart from each other, and the dimensions of each rail 47 may enable the rails 47 to be received by (e.g., slid onto, snapped into, etc.) the grooves 37 on opposite peripheral edges 36 of the base 30. The length of each rail 47 may be less than the length of its corresponding groove 37, which may enable the top 40 to be positioned at a variety of locations over the base 30. Such a configuration may enable the retainer 20 to be adjusted to fit to feet 102 of a variety of different shapes and/or dimensions. The relative locations of the indent(s) 38 in each groove 37 and the protrusion 48 on each rail 47 may enable the top 40 to be locked (e.g., reversibly locked, etc.) into place on the base 30.

The top 40 may include a rigid portion 43 and a deformable element 44. The rigid portion 43 may include the sides 46 and rails 47 of the top 40. The deformable element 44 may comprise all or part of the upper portion 42 of the top 40. As illustrated, the deformable element 44 may fill a cutout 43c in the rigid portion 43 of the top 40 and be secured within the cutout 43c (e.g., mechanically and/or adhesively, etc.). The rigid portion 43 may be formed from a material that will enable the top 40 to be assembled with and to remain assembled with the base 30 of the retainer 20. In some embodiments, the rigid portion 43 of the top 40 may be formed from the same material as the base 30. The deformable element 44 may be formed from a material that may conform to a shape of at least part of an end portion 104 of a foot 102 that has been introduced into the receptacle 26. In some embodiments, the deformable element 44 may be formed from a pliable rubber or rubber-like material, such as silicone.

As shown in FIG. 6, the base 30 of the retainer 20 may be positioned on and secured to a surface 200, an end portion 104 of a foot 102 of display screen 100 may be positioned on the base 30, and the top 40 of the retainer 20 may be positioned over the end portion 104 of the foot 102 to hold the end portion 104 in place over the surface 200. These acts may be carried out in any order. For example, the bottom surface 34 of the base 30 may be secured to the surface 200, the end portion 104 of the foot 102 may be placed on the upper surface 32 of the base 30, and the top 40 may be placed over the end portion 104 of the foot 102 and secured to the base (e.g., slid onto the base 30, snapped into place on the base 30, etc.). As another example, with the base 30 and top 40 preassembled, the retainer 20 may be introduced over the end portion 104 of the foot 102 (i.e., the end portion 104 may be introduced into the open end 28 of the receptacle 26 of the retainer 20) and then the retainer 20 may be positioned over the surface 200 and the bottom surface 34 of the base 30 of the retainer 20 may be secured to the surface 200.

Embodiments of a retainer 20 that has a base 30 and top 40 that may be assembled with and disassembled from each other, or that may be reversibly assembled with each other, may enable a display screen 100 to be secured in place over a surface 200 and then readily removed from the surface 200.

Turning now to FIGS. 7-10, another specific embodiment of the mount 10' and its retainer 20' are shown. The retainer 20' includes a base 30' and a top 40'. The base 30' may comprise a rigid plate while the top 40' may comprise a flexible tube secured to the rigid plate. More specifically, the rigid plate may include a pair of rigid plates 30u' and 301' that have been secured to each other (e.g., mechanically and/or adhesively, etc.). At least a portion of an upper rigid plate 30u' of the pair of rigid plates 30u' and 301' may be positioned in the receptacle 26' that extends through the flexible tube. The upper rigid plate 30u' may be superimposed over a lower rigid plate 301' of the pair of rigid plates 30u' and 301' with a portion of the flexible tube that defines the top 40' of the retainer 20' located between the upper rigid plate 30u' and the lower rigid plate 301'. The upper rigid plate 30u' and the lower rigid plate 301' may be secured to each other in a manner that secures the flexible tube in place relative to the pair of rigid plates 30u' and 301' that defines the base 30' of the retainer 20'.

In use, such a retainer 20' may be introduced over the end portion 104 of the foot 102 of a flat panel display 100 (FIG. 6), or the end portion 104 may be introduced into the open end 28' of the receptacle 26' of the retainer 20'. Either before or after positioning the retainer 20' on the end portion 104 of the foot 102, the retainer 20' may be positioned over the surface 200 and a bottom surface of the base 30' of the retainer 20' may be secured to the surface 200.

FIGS. 11-14 depict yet another embodiment of a mount 10" and its retainer 20". The retainer includes a base 30" and a top 40". The base 30" and the top 40" may comprise parts of a tubular element. A passage through the tubular element may define the receptacle 26" of the retainer 20". Such a retainer 20" may be referred to as having an integral structure. With added reference to FIG. 6, the base 30" may facilitate sliding of the end portion 104 of the foot 102 of the display screen 100 into and, optionally, out of the receptacle 26" of the retainer 20". The portion of the tubular element that defines the base 30" may include a material that is more rigid than a material that defines the top 40" and, optionally, other portions of the retainer 20". In such embodiments, the rigid material may be located at an open end 28" (e.g., a rear end) of the receptacle 26" of the retainer 20". The rigid material may extend (e.g., forwardly) from the open end 28", along a portion of the base 30" or along the entire base 30" of the retainer 20".

The use of the retainer 20" may include introducing the retainer 20" over the end portion 104 of the foot 102 of a flat panel display 100 (FIG. 6), i.e., introducing the end portion 104 into the open end 28" of the receptacle 26" of the retainer 20". Either before or after positioning the retainer 20" on the end portion 104 of the foot 102, the retainer 20" may be positioned over the surface 200 and a bottom surface of the base 30" of the retainer 20" may be secured to the surface 200.

Referring generally to FIGS. 1-14, a retainer 20, 20', 20" of this disclosure may carry a fastener 50 that secures a bottom surface of the base 30, 30', 30" of the retainer 20, 20', 20" to a surface 200 (FIG. 6). In addition, the fastener 50 may be removed from the surface 200 without damaging the surface 200 (e.g., a finish of the surface 200, paint on the surface 200, etc.) and, in some embodiments, while leaving substantially no residue on the surface 200. Some non-limiting examples of suitable fasteners 50 include adhesive materials (e.g., an acrylic adhesive, such as a conformable acrylic adhesive, such as SCOTCH Extreme Mounting Tape, available from 3M Company; etc.), touch fasteners (e.g., hook and loop, or Velcro, fasteners; hook and hook fasteners; etc.), and the like.

Referring now to FIGS. 15-17, various embodiments of arrangements for using mounts 10 to mount, anchor, or otherwise secure a flat panel display 100 in place on substantially horizontal surfaces 200 are illustrated. As shown in FIG. 15, such an arrangement may include placing a first mount 10 on a forward facing end portion 104f of a first foot 102 that the supports the display screen 100 in an upright orientation over the substantially horizontal surface 200 and a second mount (not shown) on a forward facing end portion (not shown) of a second foot (not shown) that supports the display screen 100 in the upright orientation over the substantially horizontal surface 200. The first foot 102 may be laterally spaced apart from the second foot (not shown). The first mount 10 and second mount (not shown) may be secured to the substantially horizontal surface 200 to prevent the display screen 100 from tipping over. Alternatively, mounts 10 may be placed on rearward facing end portions 104r of the feet 102, as shown in FIG. 16, or mounts 10 may be placed on both forward facing end portions 104f and rearward facing end portions 104r of the feet 102, as shown in FIG. 17. Embodiments where mounts 10 are secured to side facing feet are also within the scope of this disclosure.

Although this disclosure provides many specifics, these should not be construed as limiting the scope of any of the claims that follow, but merely as providing illustrations of some embodiments of elements and features of the disclosed subject matter. Other embodiments of the disclosed subject matter and of their elements and features, may be devised which do not depart from the spirit or scope of any of the claims. Features from different embodiments may be employed in combination. Accordingly, the scope of each claim is limited only by its plain language and the legal equivalents thereto.

What is claimed:

1. A mount for securing a display screen in place on a surface, comprising:
    a retainer including a base and a top that define a receptacle with a rear end that is open and dimensions that enable the rear end and the receptacle to receive a portion of a foot of the display screen, the top comprising a pliable material conformable to a shape of a portion of a top surface of the foot of the display screen; and
    a fastener on a bottom surface of the base of the retainer.

2. The mount of claim 1, wherein the pliable material of the top of the retainer is conformable to a shape of a top surface of at least an end portion of the foot of the display screen.

3. The mount of claim 1, wherein the top of the retainer comprises an elastomeric material.

4. The mount of claim 1, wherein the top of the retainer is transparent.

5. The mount of claim 1, wherein the top of the retainer is reversibly securable to the base of the retainer.

6. The mount of claim 5, wherein the top of the retainer slides onto the base of the retainer.

7. The mount of claim 5, wherein the top of the retainer snaps onto the base of the retainer.

8. The mount of claim 1, wherein the receptacle has a substantially uniform cross-sectional shape taken along a length of the receptacle.

9. The mount of claim 1, wherein the receptacle tapers outwardly from a front end of the receptacle to the rear end of the receptacle.

10. The mount of claim 1, wherein a front end of the receptacle is open.

11. The mount of claim 1, wherein an inner surface of the base facilitates sliding of at least an end of the foot into the receptacle.

12. A mount for securing an object in an upright orientation on a surface, comprising:
    a retainer including a base and a top that define a receptacle with a rear end that is open and dimensions that enable the rear end and the receptacle to receive a portion of a foot of the object, the top comprising a pliable material conformable to a shape of a portion of a top surface of the foot; and
    a fastener on a bottom surface of the base of the retainer.

* * * * *